(12) United States Patent
Beasley et al.

(10) Patent No.: US 10,253,527 B2
(45) Date of Patent: Apr. 9, 2019

(54) SMART LOCKER

(71) Applicant: STEELCASE INC., Grand Rapids, MI (US)

(72) Inventors: Charles Beasley, Grand Rapids, MI (US); Rachel Anne Neiman, Grand Rapids, MI (US); Felipe Efrain Castaneda Roldan, Grand Rapids, MI (US); Robert M. Scheper, Grand Rapids, MI (US)

(73) Assignee: STEELCASE INC., Grand Rapids, MI (US)

( * ) Notice: Subject to any disclaimer, the term of this patent is extended or adjusted under 35 U.S.C. 154(b) by 0 days.

(21) Appl. No.: 15/617,877

(22) Filed: Jun. 8, 2017

(65) Prior Publication Data

US 2017/0356218 A1     Dec. 14, 2017

Related U.S. Application Data

(60) Provisional application No. 62/348,857, filed on Jun. 10, 2016.

(51) Int. Cl.
*E05B 47/00* (2006.01)
*E05B 65/02* (2006.01)
(Continued)

(52) U.S. Cl.
CPC .......... *E05B 47/0001* (2013.01); *A47B 96/06* (2013.01); *A47B 97/00* (2013.01); *E05B 65/0075* (2013.01); *E05B 65/025* (2013.01); *G07C 9/0015* (2013.01); *G07C 9/00896* (2013.01); *A47B 2220/0036* (2013.01); *A47B 2220/0091* (2013.01); *E05B 47/0012* (2013.01); *E05B 65/0021* (2013.01);
(Continued)

(58) Field of Classification Search
CPC ... E05B 47/0001; E05B 65/025; A47B 96/06; A47B 97/06; G07C 9/0015
USPC ......................................................... 340/5.73
See application file for complete search history.

(56) References Cited

U.S. PATENT DOCUMENTS 3,977,933 A    8/1976  Sadashige
5,225,825 A    7/1993  Warren
(Continued)

FOREIGN PATENT DOCUMENTS

CN    203311492 U    11/2013
CN    103485603 A    1/2014
(Continued)

OTHER PUBLICATIONS https://www.amazon.com/Safco-Products-3240BL-Horizontal-Hanging/dp/B01DT80W7U, Apr. 1, 2016, pp. 1-4.*
(Continued)

*Primary Examiner* — Omar Casillashernandez
(74) *Attorney, Agent, or Firm* — Brinks Gilson & Lione

(57) ABSTRACT

A smart locker includes electronics to operate a user interface, including a keypad, and to receive user commands via the keypad to lock or unlock the smart locker with an electronic lock. The smart locker also receives primary input power and provides direct charging power and wireless charging power for charging electronic devices. The smart locker also is capable of receiving secondary input power to operate the electronic lock in the absence of the primary input power.

20 Claims, 11 Drawing Sheets

(51) Int. Cl.
  *G07C 9/00* (2006.01)
  *A47B 96/06* (2006.01)
  *A47B 97/00* (2006.01)
  *E05B 65/00* (2006.01)
  *H02J 7/00* (2006.01)
  *H02J 7/02* (2016.01)
  *H02J 9/06* (2006.01)
  *H02J 50/10* (2016.01)

(52) U.S. Cl.
  CPC ............ *E05B 2047/0057* (2013.01); *E05B 2047/0058* (2013.01); *G07C 9/0069* (2013.01); *H02J 7/0045* (2013.01); *H02J 7/0052* (2013.01); *H02J 7/025* (2013.01); *H02J 9/06* (2013.01); *H02J 50/10* (2016.02); *H02J 2007/0062* (2013.01)

(56) References Cited

U.S. PATENT DOCUMENTS

| | | |
|---|---|---|
| 5,820,234 A | 10/1998 | Capwell et al. |
| 5,892,298 A | 4/1999 | Levasseur |
| 5,894,277 A | 4/1999 | Keskin et al. |
| 6,489,974 B1 | 12/2002 | Johnson et al. |
| 6,600,406 B1 | 7/2003 | Ha |
| 6,800,012 B2 | 10/2004 | Maxim |
| 6,803,744 B1 | 10/2004 | Sabo |
| 6,906,495 B2 | 6/2005 | Cheng et al. |
| 7,090,380 B2 | 8/2006 | Gerfers, III |
| 7,123,147 B2 | 10/2006 | Engel |
| 7,262,700 B2 | 8/2007 | Hsu |
| 7,336,150 B2 | 2/2008 | Gokcebay et al. |
| 7,518,485 B2 | 4/2009 | Shuster |
| 7,622,891 B2 | 11/2009 | Cheng et al. |
| 7,804,187 B2 | 9/2010 | Pecoul et al. |
| 8,061,864 B2 | 11/2011 | Metcalf et al. |
| 8,228,026 B2 | 7/2012 | Johnson et al. |
| 8,262,244 B2 | 9/2012 | Metcalf et al. |
| 8,369,057 B2 | 2/2013 | Bourgeois et al. |
| 8,421,407 B2 | 4/2013 | Johnson |
| 8,490,443 B2 | 7/2013 | Gokcebay |
| 8,495,898 B2 | 7/2013 | Gokcebay |
| 8,616,031 B2 | 12/2013 | Ullrich et al. |
| 8,629,577 B2 | 1/2014 | Azancot et al. |
| 8,922,333 B1 | 12/2014 | Kirkjan |
| 9,019,067 B2 | 4/2015 | Bryla et al. |
| 9,124,308 B2 | 9/2015 | Metcalf |
| 9,208,628 B2 | 12/2015 | Gokcebay |
| 9,222,284 B2 | 12/2015 | Gokcebay |
| 9,273,492 B2 | 3/2016 | Gokcebay |
| 9,298,225 B2 | 3/2016 | Linblad et al. |
| 9,754,718 B2 * | 9/2017 | Hall ................ H01F 38/14 |
| 2002/0171335 A1 | 11/2002 | Held |
| 2003/0085796 A1 | 5/2003 | Smith |
| 2004/0070319 A1 | 4/2004 | Miller |
| 2006/0139148 A1 | 6/2006 | Faro et al. |
| 2007/0050051 A1 | 3/2007 | Chang |
| 2007/0188303 A1 | 8/2007 | Faro et al. |
| 2007/0273475 A9 | 11/2007 | Neumann |
| 2009/0178449 A1 | 7/2009 | Raatikainen |
| 2011/0225433 A1 | 9/2011 | Wan |
| 2011/0285501 A1 | 11/2011 | Chen |
| 2011/0289986 A1 | 12/2011 | Zhai et al. |
| 2012/0078413 A1 | 3/2012 | Baker, Jr. |
| 2013/0054975 A1 | 2/2013 | Wang |
| 2013/0057203 A1 | 3/2013 | Jones et al. |
| 2013/0081251 A1 | 4/2013 | Hultberg |
| 2013/0264168 A1 | 10/2013 | Usem |
| 2013/0298616 A1 | 11/2013 | Ullrich et al. |
| 2014/0091636 A1 * | 4/2014 | Ofstein ................ H02J 5/005 307/104 |
| 2014/0285140 A1 | 9/2014 | Jung |
| 2014/0347163 A1 | 11/2014 | Banter et al. |
| 2014/0366784 A1 | 12/2014 | Berger |
| 2015/0107316 A1 | 4/2015 | Kirkjan |
| 2015/0130416 A1 | 5/2015 | Lesizza |
| 2015/0167350 A1 | 6/2015 | Bryla et al. |
| 2015/0380969 A1 | 12/2015 | Malmberg et al. |
| 2016/0060909 A1 | 3/2016 | Krishnan et al. |
| 2016/0275450 A1 * | 9/2016 | Chang ................ H04L 63/0838 |
| 2017/0177031 A1 * | 6/2017 | Lesizza ................ G06F 1/1632 |
| 2018/0115168 A1 * | 4/2018 | Schatz ................ H02J 5/005 |
| 2018/0122567 A1 * | 5/2018 | Hall ................ H01F 38/14 |

FOREIGN PATENT DOCUMENTS

| | | |
|---|---|---|
| CN | 203851334 U | 9/2014 |
| CN | 104252723 A | 12/2014 |
| CN | 204763428 U | 11/2015 |
| CN | 103986214 B | 4/2016 |
| DE | 202013100544 U1 | 2/2013 |
| GB | 2528022 A | 1/2016 |
| GB | 2531313 A | 4/2016 |
| JP | 2004049284 A | 2/2004 |
| JP | 2008036101 A | 2/2008 |
| TW | 330000 U | 4/1998 |
| WO | WO 01/23695 A1 | 4/2001 |
| WO | WO 2011/017757 A1 | 2/2011 |
| WO | WO 2015/124139 A1 | 8/2015 |

OTHER PUBLICATIONS http://www.usb.org/developers/powerdelivery USB Power Delivery, retrieved Aug. 16, 2017, 3 pages.

* cited by examiner

SMART LOCKER

CROSS-REFERENCE TO RELATED APPLICATION

This application claims the benefit of U.S. Provisional Application No. 62/348,857, filed Jun. 10, 2016, the entirety of which, including its Appendix, is hereby incorporated by reference.

TECHNICAL FIELD

This disclosure relates to lockers and storage cabinets.

BACKGROUND

Lockers are used to securely store items in a lockable storage compartment. Many locker systems utilize a physical key or other similar object to effect locking and unlocking of the locker. Thus, a user must retain the key when locking the locker. Though suitable in some instances, such locker systems may not be suitable for all users and application settings.

DETAILED DESCRIPTION

Figure 1:
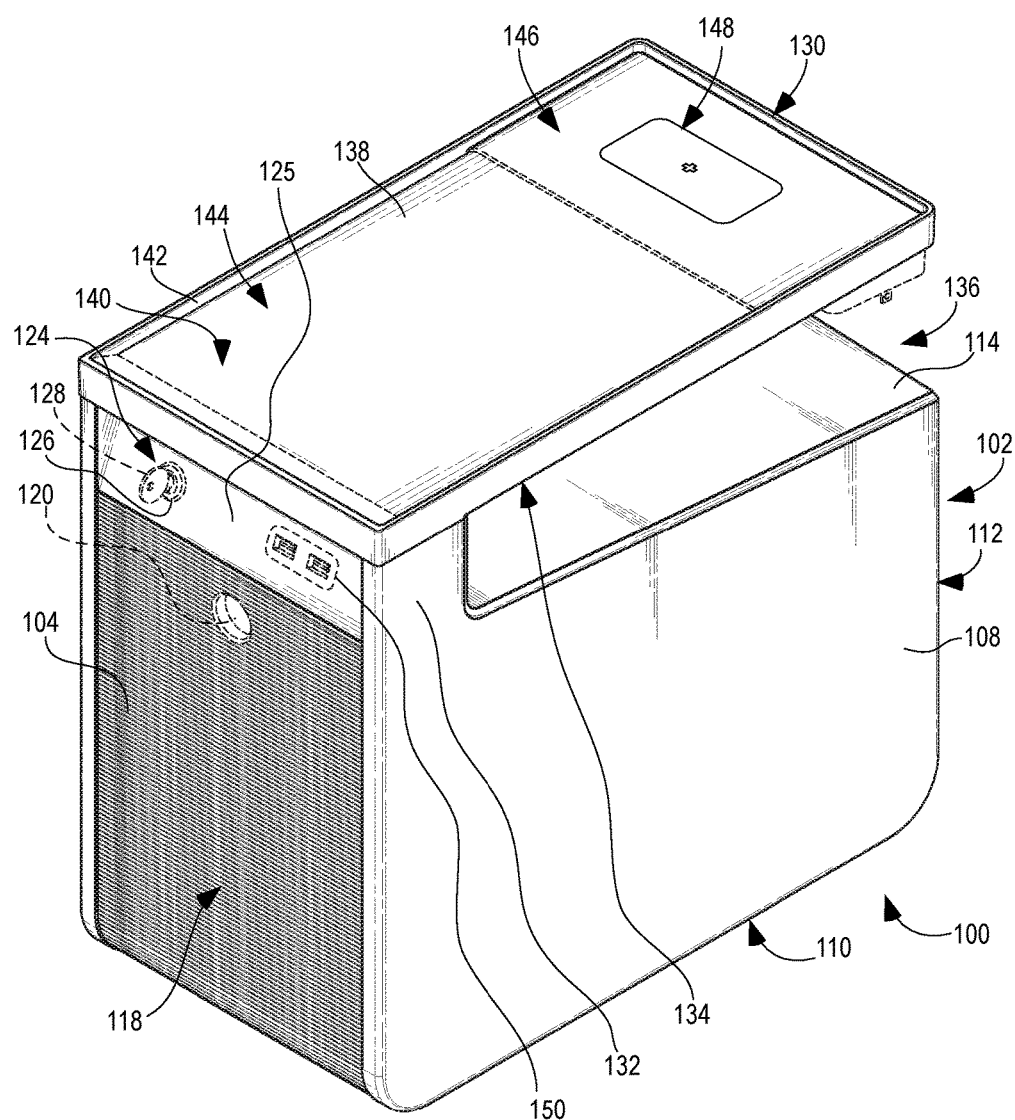
FIG. 1 shows a smart locker in accordance with various embodiments.
Figure 2:
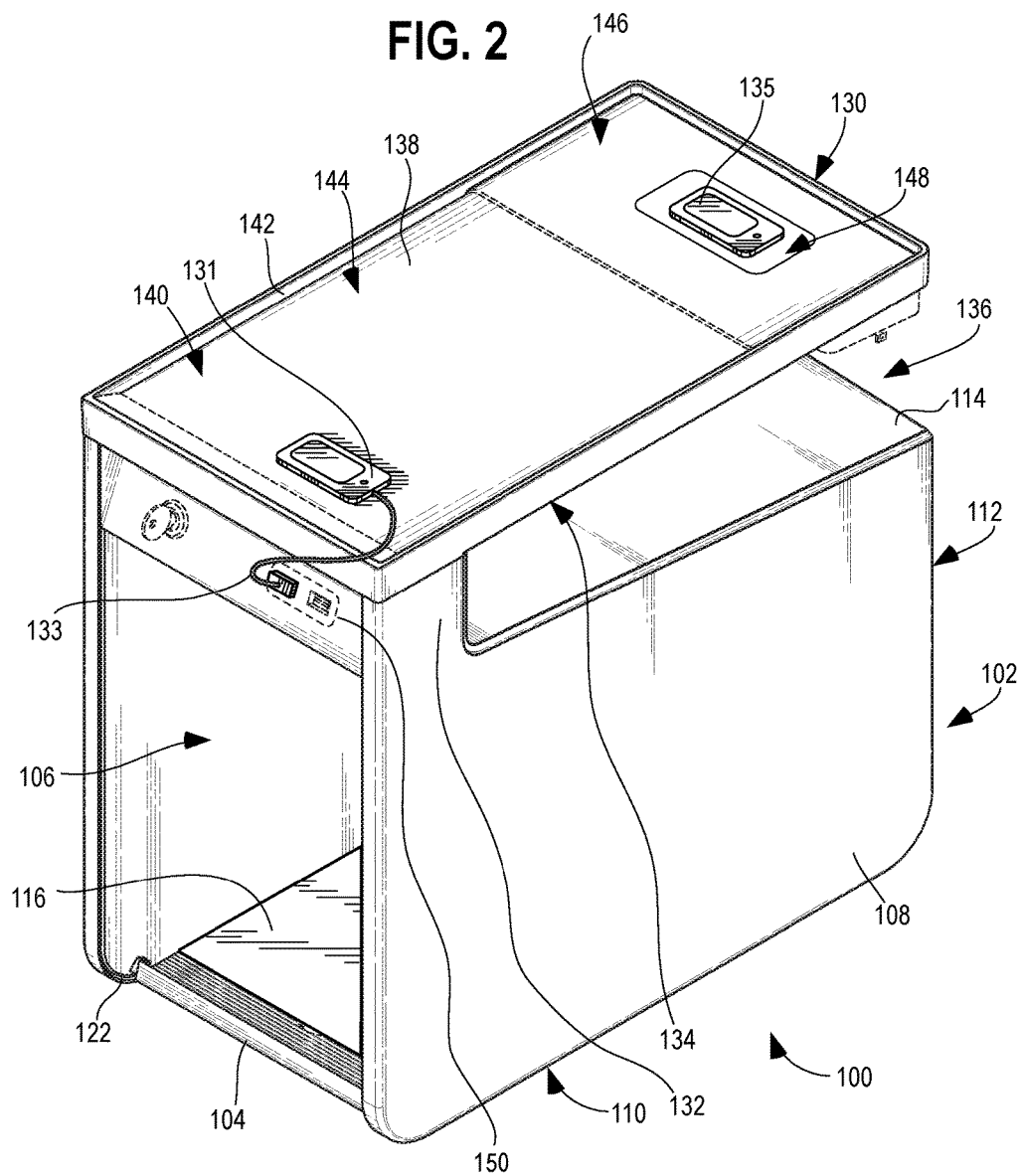
FIG. 2 shows another view of the smart locker in accordance with various embodiments.
Figure 5:
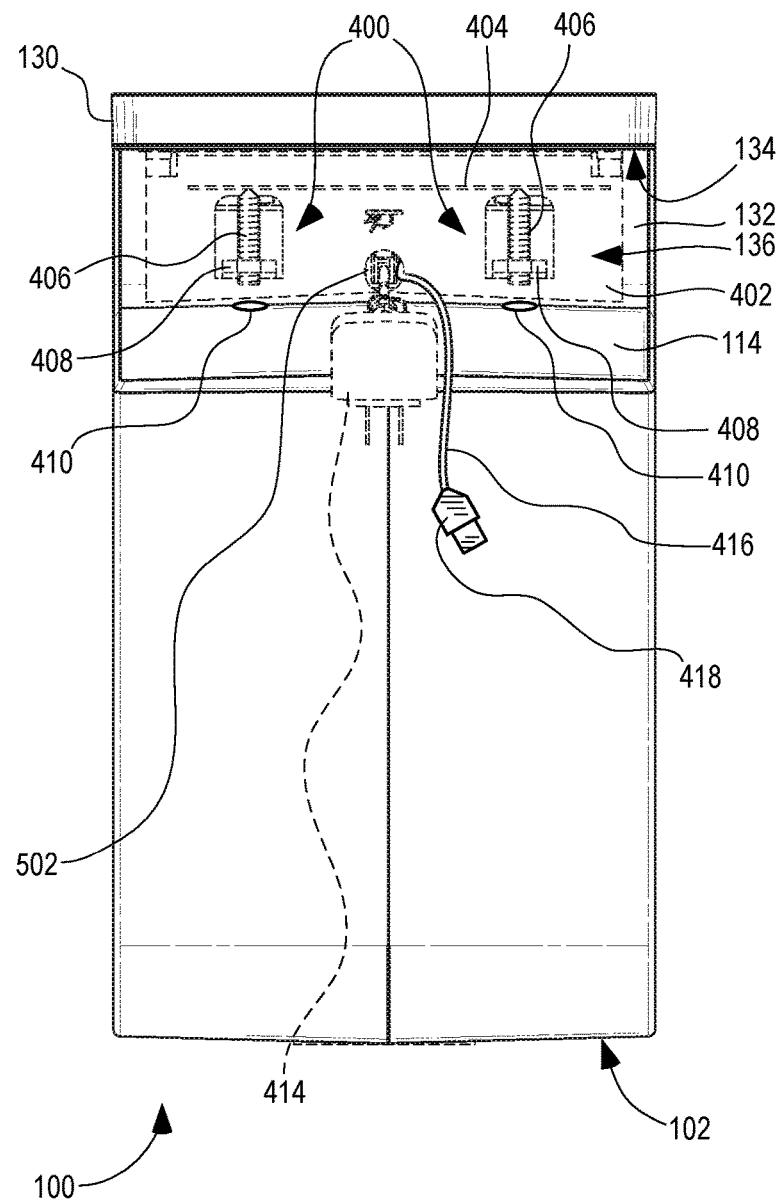
FIG. 5 shows a rear elevation view of the smart locker in accordance with various embodiments.

FIGS. 1 and 2 show a smart locker 100 in accordance with various embodiments. FIG. 1 shows the smart locker 100 in a closed configuration while FIG. 2 shows the smart locker 100 in an opened configuration. The smart locker 100 includes a main body portion 102 and a door 104. The main body portion 102 is primarily hollow and forms a storage compartment 106. In one embodiment, the main body portion 102 includes side panels 108, a bottom panel 110, a rear panel 112, and an upper panel 114 to form the storage compartment 106. Each of the panels 108, 110, 112, and 114 may be flat or may be rounded or curved. In some embodiments, borders between the various panels 108, 110, 112, and 114 may be easily delineable (e.g., with corners or edges), while in other embodiments, borders between various panels 108, 110, 112, and 114 may be less delineable (e.g., e.g. with curved or rounded transitions, as is shown where the bottom panel 110 meets the rear panel 112). Further, although the main body portion 102 is generally illustrated with a box or cuboid shaped, other shapes are contemplated, including shapes that are rounded or curved or include rounded or curved features or walls. In one embodiment, as is illustrated in FIG. 5, the main body portion 102 is formed of two separate halves. The various panels 108, 110, 112, and 114 may be formed of single solid colors, or may include designs that may be applied through a printing process, a silk-screening process, or a hydrographics process.

When the door 104 is in the open position, as shown in FIG. 2, a user may place items within or remove items from the storage compartment 106, for example, on a lower platform 116 (which may be part of bottom panel 110). The storage compartment 106 may also include one or more shelves therein (not shown), which may be movable or permanently integrated with the main body portion 102. When the door 104 is in the closed position, the main body portion 102 and door 104 together form an enclosed storage compartment 118 such that access to the enclosed storage compartment 118 and any items stored therein is prevented. In various embodiments, the enclosed storage compartment 118 may be air-tight or liquid-tight. In other embodiments, the enclosed storage compartment 118 is not air-tight or liquid-tight and may include one or more openings. For example, as is shown in FIG. 1, an opening 120 may exist within the door 104. The opening 120 may provide a finger hold to enable movement of the door 104. Further, the opening 120 may function as a pass-through port for one or more cables or cords, for example, for charging an electronic device stored within the enclosed storage compartment 118 with power provided from outside of the enclosed storage compartment 118 (e.g., via charging ports 150, discussed below).

In one embodiment, the door 104 is a sliding tambour door that can be slid down the front face of the main body portion 102 and under the bottom panel 110 or into an opening or pocket within the bottom panel 110. In such an arrangement, the main body portion 102, and specifically the side panels 108 and/or the bottom panel 110, may include grooves 122 or tracks to enable vertical sliding of the tambour door along the grooves 112. In other examples, a tambour door may be configured in other directions. For example, the tambour door may be arranged sideways to enable the tambour door to slide laterally or sideways across the front of the main body portion 102 and rearward along a side panel 108 of the main body portion 102. In still other embodiments, the door 104 may be one or more hinged solid doors that can be in hinged engagement with the main body portion 102 at one of the sides, the bottom, or the top of the door 104. In another embodiment, the door 104 is omitted and the storage compartment 106 remains exposed and accessible (e.g., operating as an open shelf or cabinet). Many variations are possible and are contemplated by this disclosure.

In various embodiments, the smart locker 100 includes a lock 124 to lock the door 104 in the closed position. The lock 124 may be included in a front interface panel 125 which may be located, for example, above the door 104 and below a top platform 130. In such an arrangement, the enclosed storage compartment 118 may be considered a secured or lockable storage compartment. The lock 124 may include a catch, a latch, or other locking mechanism that engages or captures a portion of the door 104 or a mating element of the door 104 to prevent the door 104 from opening when the lock 124 is in a locked configuration or locked position. When the lock 124 is in an unlocked configuration or unlocked position, the catch or latch or other locking mechanism disengages or releases the door 104 or mating element of the door to enable the door 104 to move away from the closed position toward the open position. For example, in the embodiments illustrated in FIGS. 1 and 2, the door 104 is prevented from sliding downward away from the closed position when the lock 124 is in the locked position.

In certain embodiments, the lock 124 is a manual lock 126. The manual lock 126 may include an actuator such as a knob, a lever, or a pushbutton within the front interface panel 125 that enables a user to move (e.g., rotate) the locking mechanism under motive force provided by the user through the actuator. In one particular example, the manual lock 126 is a key lock cylinder that receives a physical key 128 to enable actuation (e.g., rotation) of the manual lock 126 to lock or unlock the door 104. A user may remove the key 128 after locking the door 104 and may subsequently reinsert the key 128 to unlock the door 104.

Figure 10:
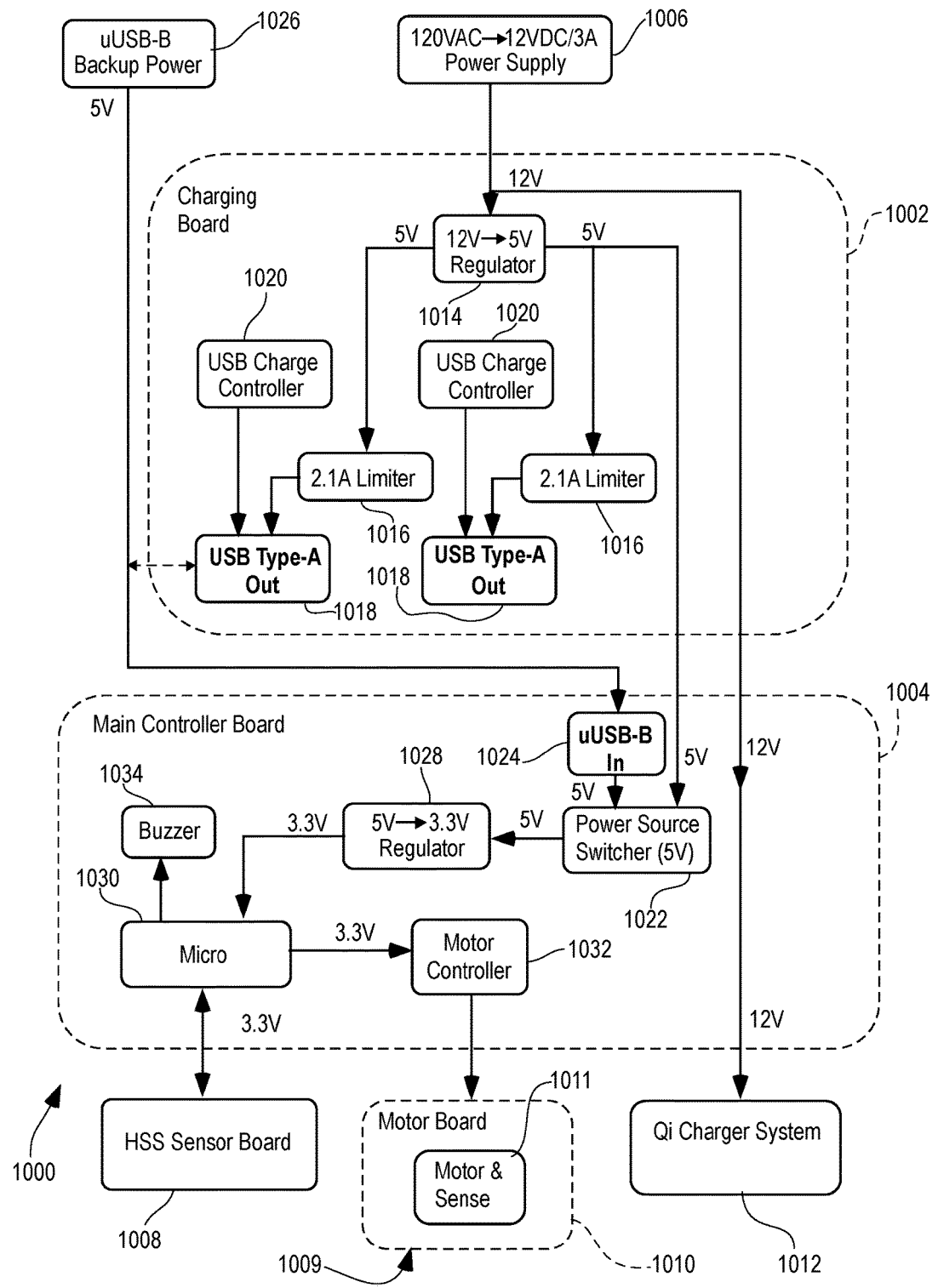
FIG. 10 shows a schematic block diagram of an electronic system of the smart locker in accordance with various embodiments.
Figure 11:
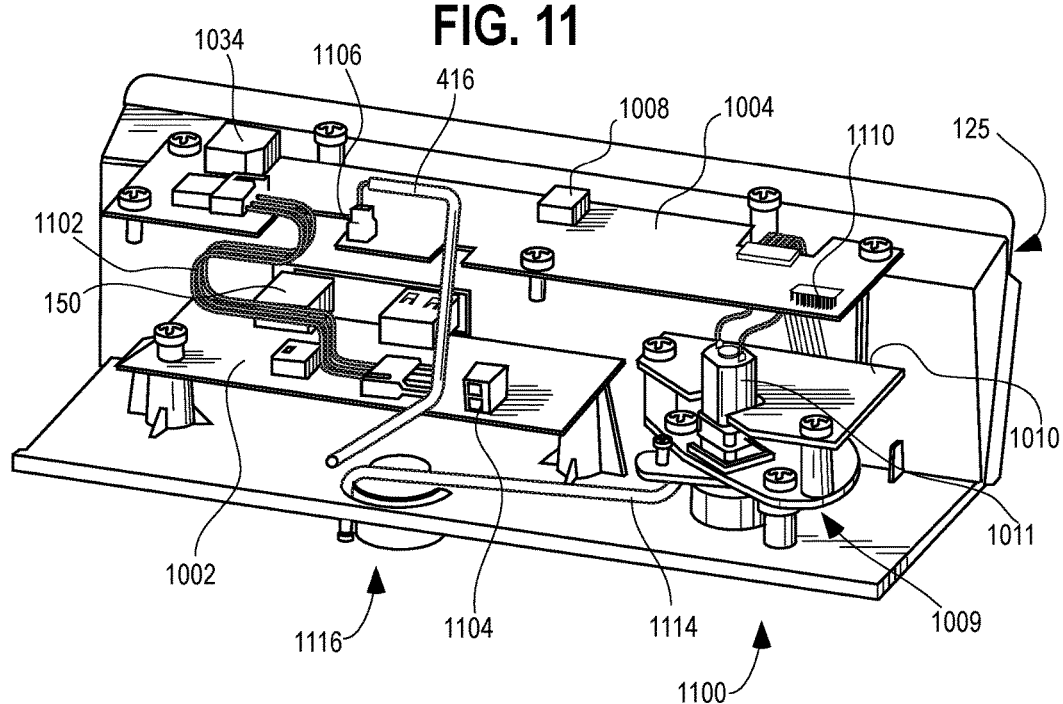
FIG. 11 shows an electronics assembly of the smart locker in accordance with various embodiments.

In another embodiment, the lock 124 is an electronic lock 1009, which may include a motor-driven lock (see FIGS. 10 and 11). In such an approach, an electronic motor 1011 or servo uses electricity to move the catch, latch, or other locking mechanism of the lock 124 to lock or unlock the door 104 (i.e., instead of by motive force from a user actuating an actuator of a manual lock 126). In such a configuration, and in certain examples, the manual lock 126 shown on the front face of the smart locker 100 may be omitted.

In yet another form, the lock 124 is a hybrid lock, including both electronic and manual functions. In one approach, the hybrid lock includes a manual actuator (e.g., knob, lever, handle, or pushbutton). However, instead of a key allowing the manual actuator to be moved (or to cause movement of the catch or latch), an electronic portion of the hybrid lock prevents movement of the catch, latch, or other locking mechanism (e.g., by electro-mechanical insertion or movement of a pin, stopper, clutch, or brake, or magnetics, to prevent rotation or movement of the manual actuator) when in a locked configuration, and allows movement of the catch, latch or other locking mechanism when in an unlocked configuration. In another approach, the electronic portion of the hybrid lock decouples or disconnects movement of a manual actuator from movement of the catch or latch of the lock when in the locked configuration, and re-couples or reconnects such movements when in an unlocked configuration. Many variations are contemplated.

The smart locker 100 also includes a top platform 130. As is shown in FIG. 2, the top platform 130 may provide a location to place various items, including, for example, electronic devices 131 (such as phones, etc.). In one example, the smart locker 100 includes direct charging ports 150 to provide direct charging power to the electronic devices 131, for example, through a charging cable 133. In another embodiment, the top platform 130 (or another location of the smart locker 100) includes a wireless charging device 600 (see FIG. 6) and a corresponding visual indicator 148 to indicate the location of the wireless charging device 600. Another electronic device 135 that includes a compatible wireless charging receiving device may be placed above or otherwise in close proximity to the wireless charging device 600 to receive wireless charging power. Direct charging and wireless charging features of the smart locker 100 are discussed in more detail further below.

The top platform 130 that is coupled to (e.g., by fasteners or the like) or integrally formed with the main body portion 102. In one embodiment, the top platform 130 is connected to the main body portion 102 at a junction portion 132. The junction portion 132 may be at or near the front portion or front face of the smart locker 100. The junction portion 132 may be formed as part of the main body portion 102, extending upward to couple to the top platform 130 (as is shown in the figures). Alternatively, the junction portion 132 may be formed as part of the top platform 130, extending downward to couple to the main body portion 102. Alternatively, the junction portion 132 may be formed of both the main body portion 102 and the top platform 130. A rear-facing side of the junction portion 132 has a height of, for example, between two and five inches between the upper panel 114 and a bottom edge 134 of the top platform 130 (though other dimensions are contemplated).

A portion of the top platform 130 (e.g., extending along the top platform 130 from the rear to the junction portion 132) is spaced from the main body portion 102 (e.g., from the upper panel 114 of the main body portion 102) to form a receiving opening 136. In one embodiment, a height of the receiving opening 136 increases when moving from the front to the rear of the smart locker 100 (e.g., the height of the receiving opening 136 is larger at the rear of the smart locker 100 than at the junction portion 132. The height difference may be caused by a downward angled or downward sloping configuration of the upper panel 114 of the man body portion 102.

Figure 3:
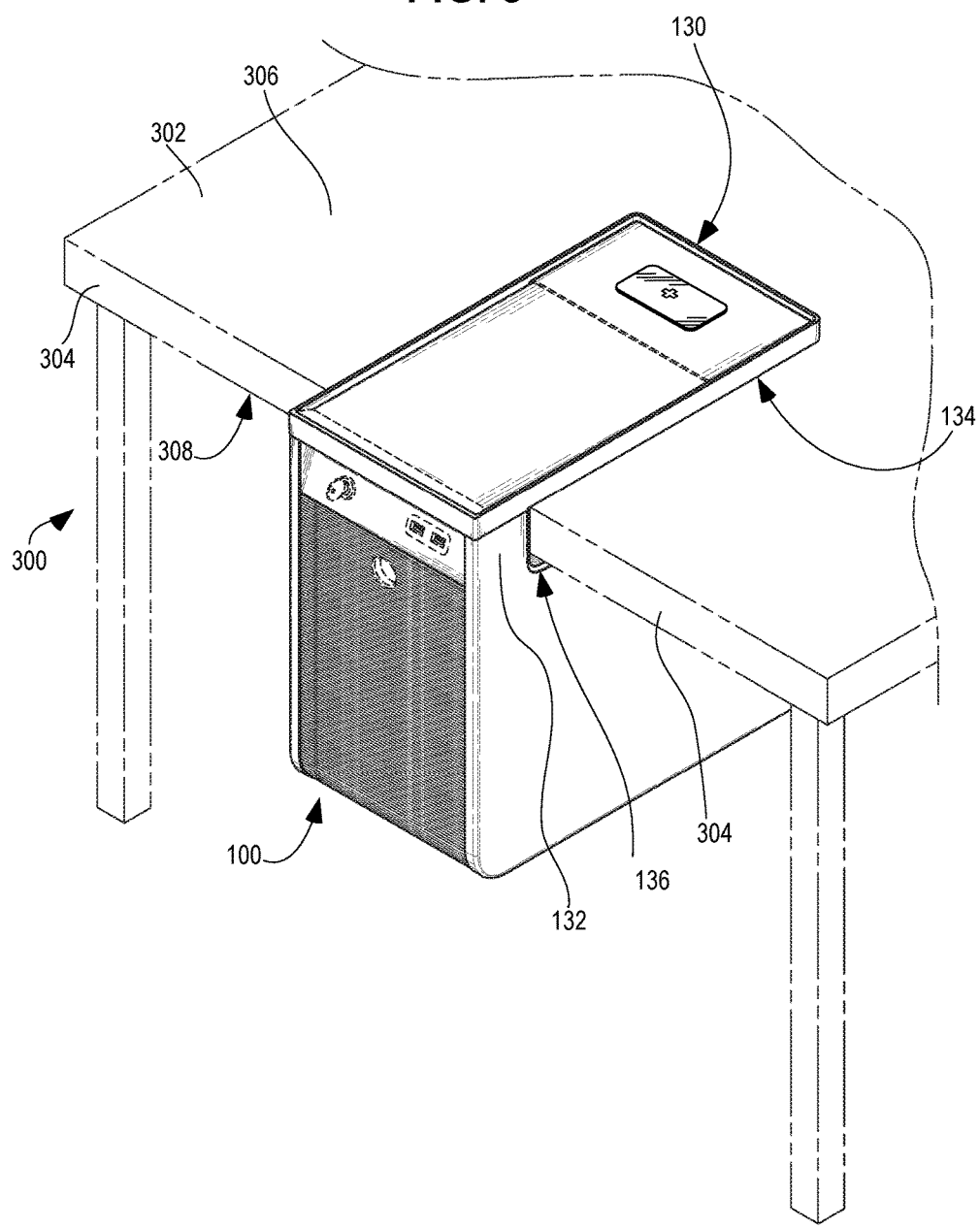
FIG. 3 shows the smart locker attached to a work surface in accordance with various embodiments.

Turning now to FIG. 3, the receiving opening 136 is configured to receive a work surface 302. The work surface 302 may be part of an item of furniture 300 or an installation, such as a table, a desk, a work station, a workbench, a bar, a counter top, a credenza, a stand, a platform, a bench, a buffet, or other types of furniture 300 or installations. The smart locker 100 can be slid rearwardly relative to the work surface 302 such that a horizontal plane (e.g., a horizontal plane just below the bottom edge 134 of the top platform 130) of the receiving opening 136 is substantially occupied by the work surface 302. An edge 304 of the work surface 302 slides forward relative to the smart locker 100 until it is at or near the rear-facing side 402 of the junction point 132. The top platform 130 sits on top of the work surface 302 and supports the smart locker 100 such that the smart locker 100 hangs from the work surface 302. More accurately, the bottom edge 134 of the top platform 130 sits on top of and engages a top surface 306 of the work surface 302. The main body portion 102 of the smart locker 100 is supported by and suspended below the work surface 302 via the junction portion 132. In this arrangement, the storage compartment 106 exists entirely or substantially below the work surface 302 (or at least below the top surface 306 of the work surface 302).

Figure 4:
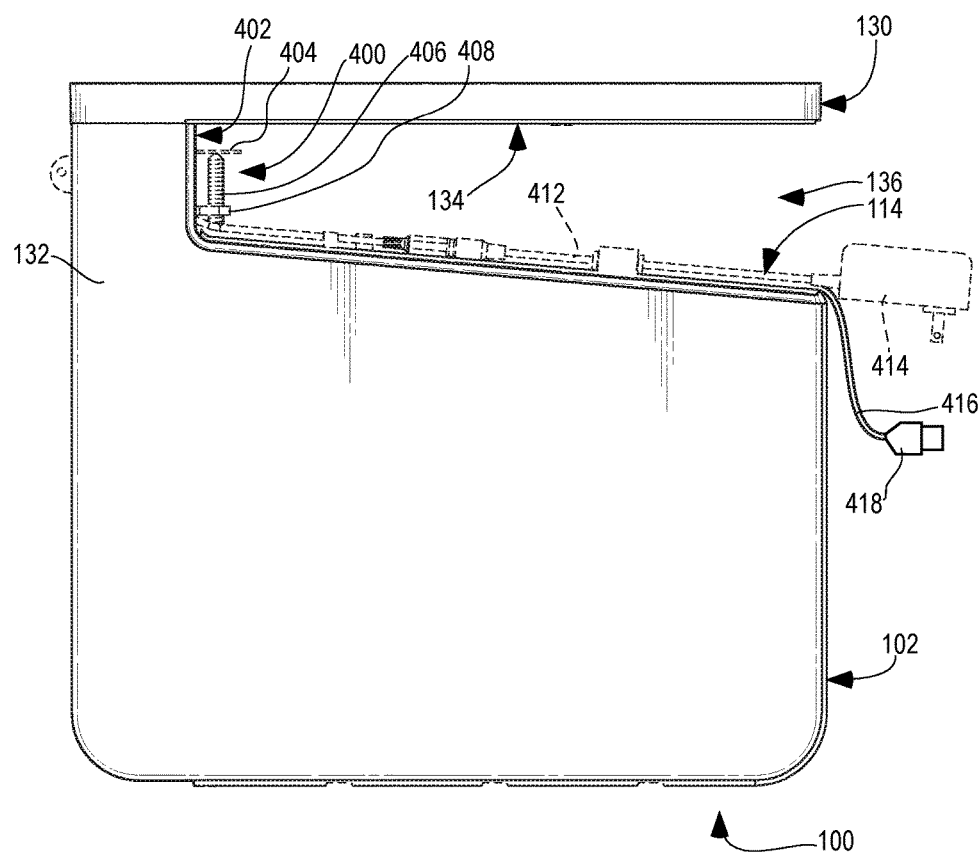
FIG. 4 shows a side elevation view of the smart locker in accordance with various embodiments.
Figure 6:
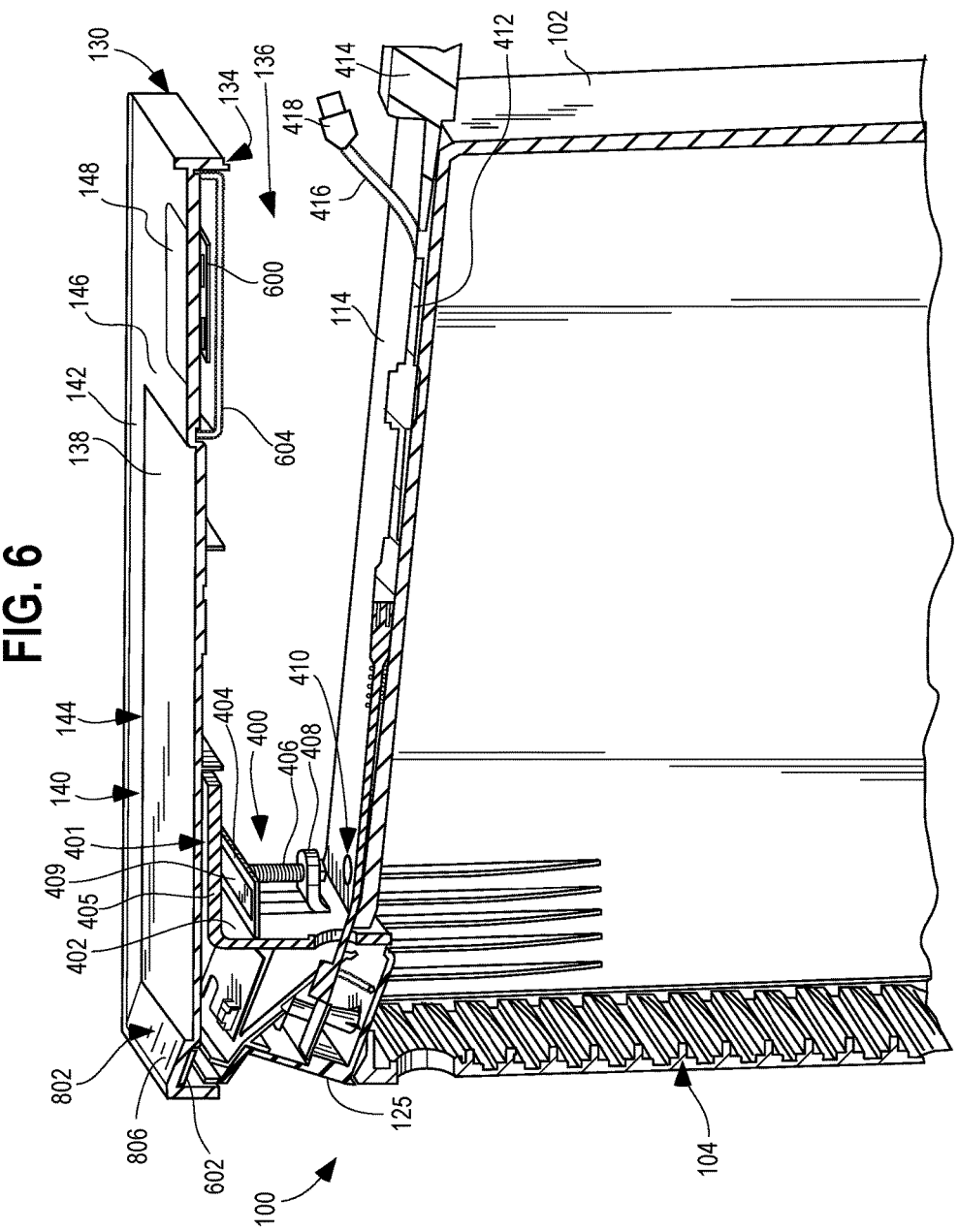
FIG. 6 shows a sectional view of the smart locker in accordance with various embodiments.
Figure 7:
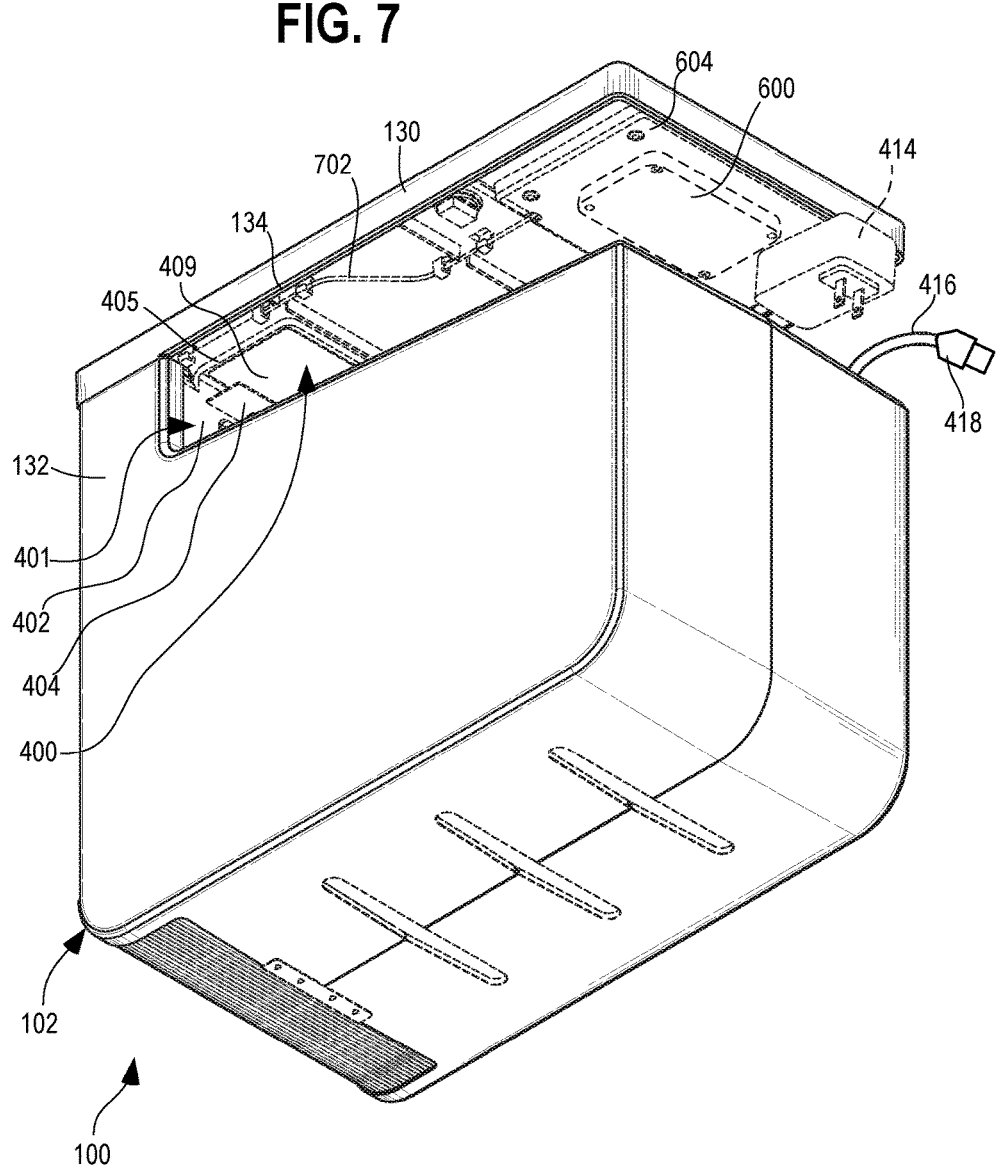
FIG. 7 shows another view of the smart locker in accordance with various embodiments.

FIG. 4 shows a side elevation view of the smart locker 100. FIG. 5 shows a rear elevation view of the smart locker 100. FIG. 6 shows a side sectional view of the smart locker 100. FIG. 7 shows a forward and upward perspective view of the smart locker 100. As is shown in FIGS. 4, 5, 6, and 7, the smart locker 100 includes a clamping mechanism 400 near the rear-facing side 402 of the junction portion 132 or forming a part of the rear-facing side 402 of the junction portion 132. For example, as is best shown in FIG. 6, clamping mechanism 400 may include an L-bracket 401, wherein a vertical portion of the L-bracket 401 forms the rear-facing side 402 of the junction portion 132. A horizontal portion 405 of the L-bracket 401 may extend rearward from the rear-facing side 402 of the junction portion 132 along the bottom edge 134 of the top platform 130. In one approach, the horizontal portion 405 of the L-bracket 401 may function as a portion of the bottom edge 134 of the top platform 130 to sit on the top surface 306 of the work surface 302 and support the smart locker 100 thereon.

The clamping mechanism 400 also includes a clamp bar 404 which can be moved up or down vertically along the rear-facing side 402 of the junction portion 132 by turning threaded bolts 406. The threaded bolts 406 are captured within threaded flanges 408 and are turned or rotated to move the threaded bolt longitudinally relative to the threaded flanges 408. The threaded flanges 408 may be integrated with the rear-facing side 402 and/or the L-bracket 401. The bottom of the threaded bolts 406 may include a slot or socket to receive a screwdriver, hex wrench, Torx wrench, or a similar tool to effect turning of the threaded bolts 406. During installation of the smart locker 100 onto a work surface 302, the clamp bar 404 is lowered such that a portion of the work surface 302 (e.g., an edge portion) is placed between the clamp bar 404 and the horizontal portion 405 of the L-bracket 401 (or between the clamp bar 404 and the bottom edge 134 of the top platform 130). The smart locker 100 is slid rearward until an edge 304 of the work surface 302 contacts or nearly contacts the rear-facing side 402 of the junction portion 132. The threaded bolts 406 are then turned to raise the clamp bar 404 to engage the bottom edge 308 of the work surface 302. The threaded bolts 406 are then tightened to clamp the work surface 302 between the top of the clamp bar 404 and the horizontal portion 405 of the L-bracket 401 (or between the clamp bar 404 and the bottom edge 134 of the top platform 130) such that the smart locker 100 cannot be easily removed from the work surface. The clamp bar 404 may be capable of adjusting to different profile edges of various work surfaces 302 by being able to be tilted forward or backward. The top surface of the clamp bar 404, the bottom surface of the horizontal portion 405 of the L-bracket 401, and/or the bottom edge 134 of the top platform 130 may include grip strips 409, such as rubber strips, strips of rubber-like material, or adhesive strips, to keep the smart locker 100 from sliding on the work surface 302 or coming loose from the work surface 302.

The upper panel 114 of the main body portion 102 may include a hole 410 such that the lower ends of the threaded bolts 406 can pass through the upper panel 114 and into the storage compartment 106. In some examples, the lower ends of the threaded bolts 406 may only be accessible from within the storage compartment 106 to loosen or tighten the threaded bolts 406. For example, if the work surface 302 is thick enough, the threaded bolts 406 will remain relatively low and extend into the storage compartment 106 such that the ends are only accessible from within the storage compartment 106. If the door 104 is closed and locked, then a would-be thief cannot access the ends of the threaded bolts 406 to easily remove the smart locker 100 from the work surface 302. Even if the ends threaded bolts 406 are above the holes 410 (e.g., if the smart locker 100 is attached to a thin work surface), the threaded bolts 406 are still not easily accessible, and are certainly not as easily accessible as when the storage compartment 106 is open.

So configured, the smart locker 102 remains with the work surface 302 even if the item of furniture 300 is movable (e.g., with castors or wheels) or the height of the work surface 302 is variable (e.g., variable height desks and tables). This eliminates a need to move a separate cabinet or storage whenever the item of furniture 300 is moved while still providing modular storage functionality. Further, such an arrangement allows the smart locker 100 to be placed onto any height work surface 302 while maintaining a similar user experience of a similar or identical distance from the work surface 302 to the storage compartment across different items of furniture 300, independent of the height of the work surface 302.

Figure 8:
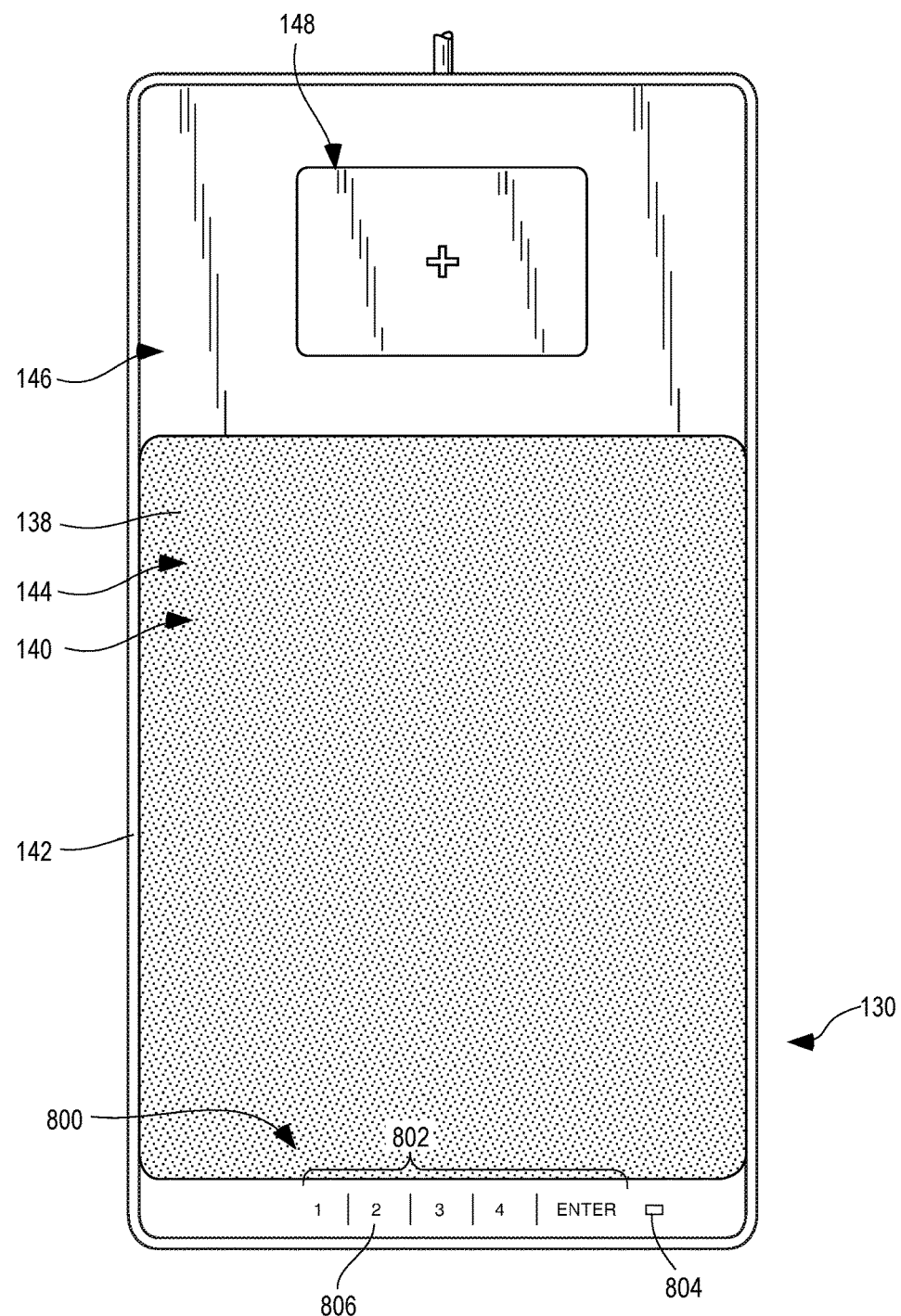
FIG. 8 shows a top view of a top platform of the smart locker in accordance with various embodiments.

FIG. 8 is a top view of the top platform 130. With reference to FIGS. 1, 2, 6, and 8, in various embodiments, the top surface 138 of the top platform is elevated relative to the top surface 306 of the work surface 302. In such a manner, the top surface 302 of the top platform 130 is a defined platform upon which users may place any number of different items including electronic devices. In one embodiment, the top surface 138 of the top platform 130 is shaped to form a tray 140, including raised perimeter edges 142. In other embodiments, the top surface 138 does not include raised perimeter edges 142 and is a platform with sharp or rounded perimeter edges.

In various embodiments, the top platform 130 includes two separate areas, for example, a storage tray portion 144 and a charging portion 146. In one approach, the storage tray portion 144 is located toward the front of the smart locker 100 and the charging portion 146 is located toward the rear of the smart locker 100, though other orientations may exist (e.g., reversed order or side-by-side). In one embodiment, the charging portion 146 may be at a different height (e.g., raised) relative to the storage tray portion 144. In another embodiment, the top surface 138 of the top platform 130 may include a different material or texture at the charging portion 146 compared to the storage tray portion 144. For example, the storage tray portion 144 may include a felt or similar material, while the charging portion 146 may not include such a material and may be formed simply of the material that forms the top platform 130 (e.g., injection molded plastic). In another embodiment, the storage tray portion 144 may not be clearly delineated from the charging portion 146 and the two portions exist as a singular tray 140 or platform. The charging portion 146 may include a visual indicator 148 (e.g., a marking, a screen-printed image, a light, a texture, a raised or grooved molded pattern or image, a decal, a sticker, an indentation, a dip, a hump, or a different visual indicator) providing a visual indication of the presence of a wireless charging device 600 under or proximate to the visual indicator 148 for wireless charging (e.g., inductive charging) of electronic devices.

As is shown in FIGS. 6 and 7, in one embodiment, the top platform 130 includes the wireless charging device 600. The wireless charging device 600 may be an inductive charging device including one or more inductive charging coil (or coils) or an inductive charging mat. In one example, the wireless charging device 600 adheres to the Qi inductive power standard from the Wireless Power Consortium. The wireless charging device 600 is configured to provide wireless charging power to a wireless charging receiving device of another electronic device 135 (e.g., a phone or tablet) via inductive coupling between the wireless charging device 600 and the wireless charging receiving device in the electronic device 135 when the electronic device 135 is placed in close proximity to the wireless charging device 600 (see FIG. 2). For example, the electronic device 135 may be placed within the area demarcated by the visual indicator 148 and may subsequently receive wireless power.

In one embodiment, a lower tray 604 may be coupled to and underside of the top platform 130. The wireless charging device 600 may be mounted to and upper surface of the lower tray 604 (e.g., by screws or adhesives) such that the wireless charging device 600 is housed between the underside of the top platform 130 and the lower tray 604. A power cable 702 may be routed from circuitry within the junction portion 132 to the wireless charging device 600 to provide power to the wireless charging device 600. In such an arrangement, the lower tray 604, the wireless charging device 600, and the power cable 702 form a modular component of the smart locker 100 that may be optionally included or not included at manufacturing time, installation time, or at a later time (e.g., to retrofit or upgrade an existing smart locker 100 with wireless charging capabilities).

In other embodiments, the wireless charging device 600 is connected directly to the underside of the top platform 130. If the top platform 130 includes thicker molded wall portions, or is made of a thicker material (e.g., wood or composite materials), a bore or other cavity may be made within the underside of the top platform 130 to provide a space for the wireless charging device 600 to fit between the top surface 306 of the work surface 302 and below the top surface 138 of the top platform 130. Further, such a bore or cavity serves to decrease the distance between the wireless charging device 600 and the top surface 138 of the top platform 130 so as to improve inductive coupling (and therefore the power transfer efficiency) between the wireless charging device 600 and any wireless charging receiving devices inductively coupled thereto. In another embodiment, the wireless charging device 600 is inserted into a bore hole or cavity formed in the top surface 138 of the top platform 130. A portion of the wireless charging device 600 (e.g., a lip or a flange) may sit on top of the top surface 138 of the top platform 130 in such an arrangement. In another example, the top surface of the wireless charging device 600 is flush with the top surface 138 of the top platform 130.

The electronic device 135 may be a portable battery operated electronic device such as a phone, a tablet, a laptop, a tool, a toy, or any other portable battery operated electronic device that includes or is connected to a wireless charging receiving device.

Figure 9:
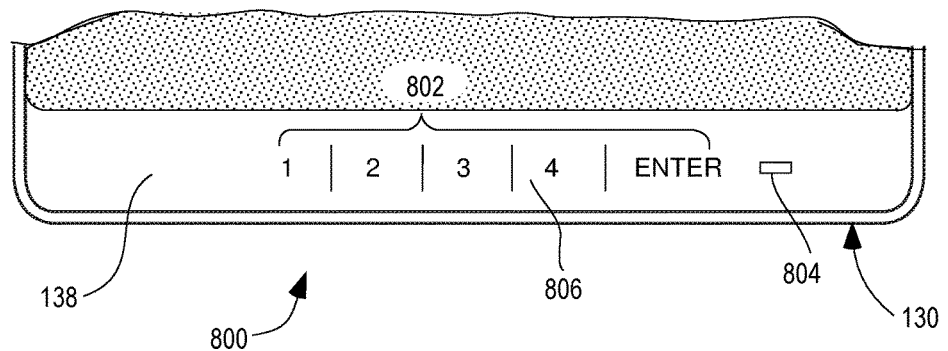
FIG. 9 shows a user interface of the smart locker in accordance with various embodiments.

Turning now to FIGS. 8 and 9, the top platform 130 may include a user interface 800, or a portion of a user interface 800. FIG. 9 illustrates an enlarged view of a user interface 800. The user interface 800 may include a keypad 802 and, optionally, a light 804. The light 804 may be a light emitting diode (LED) or an incandescent light, which may provide visual feedback to a user of the smart locker 100. For example, the light 804 may remain illuminated, remain off, or flash in various patterns dependent upon a state of the smart locker 100 or upon interactions with a user. For example, the light 804 may flash whenever a key of the keypad 802 is activated by a user to provide visual feedback of activation. Further, the light 804 may be illuminated when the smart locker 100 is locked and not illuminated when the smart locker 100 is unlocked. The light 804 may flash in various patterns to provide various feedback to a user, such as error codes or the like.

In certain embodiments, the keypad 802 is a capacitive touch keypad. In another example, the keypad 802 is a signature sensing touchpad touchpad that senses touch signatures (e.g., as opposed to pre-determined capacitive setpoints). In one specific example, the capacitive signature sensing touchpad is a heuristic signature sensing (HSS™) touchpad, as is available from AlSentis®, based in Holland, Mich., USA, or a similar type of capacitive signature sensing touchpad.

The touch surface 806 of the keypad 802 may be formed in the top surface 138 of the top platform 130, for example, at a front top edge of the top platform 130. For example, the touch surface 806 of the keypad 802 may be part of the top surface 138 of the top platform 130 such that it is integral with the top surface 138 (e.g., made in a same molding process) and formed of the same material as the top platform 130. In various embodiments, the keypad 802 may be indistinguishable from the surrounding portion of the top surface 138 of the top platform 130 except for any markings, indentations, or other indicia included on the top surface 138 indicating the particular area of the top surface 138 as a key of the keypad 802.

The keypad 802 may include a circuit board or flexible circuit mounted below the top surface 138, for example, on the opposite side of a portion of a molded wall of the top platform 130 that forms the touch surface 806 of the keypad 802. FIG. 6 shows a keypad circuit board 602 mounted below the portion of the top surface 138 that forms the touch surface 806 of the keypad 802. In one embodiment, the keypad circuit board 602 senses changes in capacitance and/or electric fields at different locations (i.e., corresponding to different individual keys of the keypad 802) to determine whether a touch event occurred (that is, to determine whether a user has touched a particular key of the keypad 802). As is discussed below, the circuit board 602 is connected to a keypad circuitry connector 1110 of controller board 1004 to provide touch event data to a microcontroller 1030 on the controller board 1004 (see FIGS. 10 and 11).

In other approaches, the keypad 802 may include other suitable keypad types such as, for example, a mechanical keypad with movable actuators, a video touchscreen, a resistive touchpad, a surface acoustic wave touchpad, an infrared grid touchpad, or other touchpad types.

The keypad 802 may include different numbers, letters, symbols, colors, or other identifiers to distinguish the individual keys. In another approach, the keypad 802 does not include any identifiers, but only includes delineators (e.g., lines) between each key such that the order of the key or the physical placement of the key serves as its identifier (e.g., the left most key, the second key, etc.). The keypad 802 may include any suitable number of individual keys. In one embodiment, the keypad 802 includes four numbered keys (1, 2, 3, 4) and an enter key. In a particular embodiment, the enter key may be spaced from the four number keys.

The user interface 800 may also include a sound generator 1034 (see FIGS. 10 and 11), such as a piezoelectric buzzer or a speaker that can generate click sounds or other sounds to provide feedback to a user. For example, the sound generator 1034 can produce a click sound whenever a key of the keypad 802 is activated by a user to provide audible feedback of activation. The sound generator 1034 may be provided on a controller board 1004 supported below the top surface 138. The sound generator 1034 may be located near and/or underneath the touch surface 806 of the keypad 802 such that any noise (e.g., click) generated by the sound generator 1034 may resonate the touch surface 806 to provide to the user a tactile feedback sensation in addition to the audible feedback.

In certain embodiments, the smart locker 100 includes various electrical components and circuitry to perform certain functions, as is discussed in further detail below. With reference to FIGS. 4-6, to receive power to operate the various electrical components and circuitry, the smart locker 100 includes or is coupled to a primary power input cord 412. The primary power input cord 412 enters the smart locker 100 through a hole 502 in the rear-facing side 402 of the junction portion 132 to connect to circuitry housed within the junction portion 132. In one embodiment, the primary power input cord 412 is electrically connected to a wall receptacle 414 that includes primary power supply circuitry 1006 (see FIG. 10). In one approach, the primary power supply circuitry 1006 receives primary input power (e.g., 120 VAC) from a primary power source (e.g., mains power from a wall outlet, power strip, or the like). The primary power supply circuitry 1006 may convert the received primary input power (e.g., 120 VAC) into a suitable primary operating power (e.g., 12 VDC) for operating all or portions of the circuitry of the smart locker 100.

In an alternative embodiment, the primary power input cord 412 may be connected to a separate power supply, for example, as may be provided for operation of other aspects or systems of the item of furniture 300 or other systems. In one example, the item of furniture 300 may be a desk that includes a motor to raise and lower the work surface 302, which motor might include a power supply that can provide the necessary primary power to the smart locker 100 without the need for a separate wall receptacle. In such an alternative embodiment, the separate power supply may be considered the primary power supply circuitry for providing primary operating power to the smart locker 100.

In another embodiment, the smart locker 100 includes a secondary power input cord 416, which also may run through the hole 502 into the smart locker 100 to connect to circuitry housed within the junction portion 132. The secondary power input cord 416 may include or be connected to a secondary power input connector 418. The secondary power input connector 418 may be a standard connector such as, for example, a Universal Serial Bus (USB) type A, type B, type mini-A, type mini-b, type micro-a, type micro-b, type micro-b USB 3.0, or USB-C connector, a firewire connector, a Thunderbolt connector, a Lightning connector, or any other standard interface connector types. The secondary power input connector 418 may be a plug or a jack. In various embodiments, the secondary power input cord 416 is wrapped up and stored within or near the receiving opening 136 of the smart locker 100 for emergency backup power use, as is discussed below. In other embodiments, the secondary power input connector 418 is provided in a different location and as a port (e.g., a jack) instead of at the end of the secondary power input cord 416, for example on a front portion (e.g., the front interface panel 125) or side portion of the smart locker 100. In another embodiment, the charging ports 150 are bi-directional such that one or any of the charging ports 150 functions as the secondary power input connector 418 in the absence of primary input power from the primary power source. In such an approach, the charging ports 150 provide charging power for directly charging an electronic device when primary input power from the primary source is present. However, in the absence of the primary input power from the primary power source (e.g., during a power outage condition) the charging ports 150 can function as the secondary power input connector 418 to receive the secondary input power from the secondary power source.

In one embodiment, a secondary power source can be connected to the secondary power input connector 418 to provide secondary input power to some or all of the circuitry elements of the smart locker 100 in the absence of the primary input power from the primary power source. In one embodiment, the smart locker 100 can use the secondary input power to operate an electric lock 1009 to lock or unlock the door 104 of the smart locker 100 in the absence of the primary input power from the primary power source.

FIG. 10 shows a schematic block diagram of an electrical system 1000 of the smart locker 100 in accordance with various embodiments. The electrical system 1000 may include a charging board 1002 and a controller board 1004. The electrical system may also include primary power supply circuitry 1006, keypad circuitry 1008, electronic lock motor circuitry 1010 (including electronic motor 1011, which together form electronic lock 1009), and wireless charging circuitry 1012. The charging board 1002 may receive primary input power (e.g., 12 VDC) from the primary power supply 1006. The primary power supply 1006 may be part of the wall receptacle 414 and the charging board 1002 may receive the primary power via the primary power input cord 412. The primary power supply 1006 may receive mains power (e.g., 120 VAC), for example, from a standard wall power outlet or power strip. The charging board 1002 may provide the primary input power to the wireless charging circuitry 1012 either directly or through the controller board 1004. In one example, the wireless charging circuitry 1012 is the wireless charging device 600, and charging board 1002 or the controller board 1004 provides power to the wireless charging device 600 via the power cable 702 shown in FIG. 7.

The charging board 1002 also provides charging power to the charging ports 150. A first regulator 1014 of the charging board 1002 also receives the primary input power and may produce a second operating power (e.g., 5 VDC) from the primary input power. The second operating power can then be provided to one or more current limiters 1016 (e.g., limited to 2.1 Amp to comply with USB current maximums, though other maximum current values are possible) to provide charging power. The current limiters 1016 provide the charging power to charging port circuitry 1018. One or more charge controllers 1020 may also be coupled to the charging port circuitry 1018 to control the output of the charging power through the charging port circuitry. In one embodiment, the charging port circuitry 1018 includes the charging ports 150 shown in FIGS. 1 and 2. In one specific embodiment, the charging ports 150 are USB Type-A output ports, and the charging port circuitry 1018 and charge controllers 1020 are configured to provide direct charging power in accordance with USB Type-A requirements. In another specific embodiment, the charging ports 150 are USB Type-C output ports, and the charging port circuitry 1018 and charge controllers 1020 are configured to provide direct charging power in accordance with USB Type-C requirements. In this same embodiment (USB Type-C) or other with other bi-directional power delivery compatible connectors, the charging port circuitry 1018 and charge controllers 1020 may also be configured to receive secondary input power (e.g., backup power) from a secondary power source 1026 (e.g., from a battery powered electronic device) for operation of various circuitry components, for example, to enable unlocking of the smart locker 100 in the absence of the primary input power (e.g., during a power outage). It should be understood that, in such a bi-directional power delivery arrangement, the secondary power supply 1026 may also be a same electronic device (e.g., electronic device 131 or 135 in FIG. 2) as was being directly or wireless charged prior to the power-outage.

Other charging port 150 configurations and specifications are contemplated. For example, the charging ports 150 may include, for example, USB type B, type mini-A, type mini-B, type micro-A, type micro-B, type micro-B, USB 3.0, firewire, Thunderbolt, or Lightning connectors, or any other standard or non-standard interface connector types. In these various embodiments, the charging port circuitry 1018 and charge controllers 1020 may be configured to provide direct charging power in accordance with the specifications of the particular connector type.

In one embodiment, the controller board 1004 receives the second operating power (e.g., 5 VDC developed by the first regulator 1014) from the charging board 1002. A power source switcher 1022 of the controller board 1004 receives the second operating power. In one embodiment, the power source switcher 1022 is also coupled to secondary input power receiving circuitry 1024. The secondary input power receiving circuitry 1024 may include an input connector (such as secondary power input connector 418 or a different secondary input power port) to receive the secondary input power from the secondary power source 1026. In one specific embodiment, the input connector is a USB micro-B type input connector. The power source switcher 1022 may determine that the second operating power from the charging board 1002 is present and may prohibit receipt of secondary input power. However, when the power source switcher 1022 determines the second operating power from the charging board 1002 is no longer present (e.g., during a power outage), the power source switcher 1022 may enable receipt of the secondary input power from the secondary power supply 1026.

The power source switcher 1022 provides the received power (whether it is the second operating power from the charging board 1002 or the secondary input power from the secondary power supply 1026) to a second regulator 1028 to step the voltage down further to a third operating power (e.g., 3.3 VDC) that is provided to a microcontroller 1030 or other processing device. The microcontroller 1030 can interface with a motor controller 1032 to operate the electronic lock motor circuitry 1010 to lock or unlock the electronic lock 1009. Additionally, the microcontroller 1030 can interface with the sound generator 1034 (e.g., piezoelectric buzzer) to generate audible sounds as part of the user interface 800. The microcontroller 1030 also interfaces with the keypad circuitry 1008. In one embodiment, the keypad circuitry is the keypad circuit board 602 shown in FIG. 6, which detects and determines touch events at the keypad 802.

The microcontroller 1030 is configured to control the electronic lock 1009 according to user commands and/or other parameters or programming logic. For example, a user may provide a command to lock the smart safe 100. In one approach, a lock command entails the user entering a PIN code at the keypad 802 and pressing an enter key. In another approach, a lock command entails a user pressing the enter key (or a "lock" key, or the like) without entering a new PIN code, for example, if the PIN is already stored in memory. In response to receiving a valid lock command, the microcontroller 1030 can cause the electronic lock motor circuitry 1010 to lock the electronic lock 1009 to lock the smart safe 100. The microcontroller 1030 may receive a status from the motor controller 1032 that the electronic lock 1009 is successfully locked and the microcontroller 1030 may control the user interface 800 to provide visual feedback (e.g., illuminate light 804) or audible feedback (e.g., a particular tone or sound produced by the sound generator 1034) to indicate that the smart locker 100 is locked.

In another example, the user may provide a command to unlock the smart safe 100. In one approach, an unlock command entails the user recalling and entering a proper PIN code at the keypad 802 (e.g., a PIN code that matches a PIN code stored within memory) and, possibly, pressing the enter key. If the microcontroller 1030 determines that the PIN code is proper, the microcontroller 1030 can cause the electronic lock motor circuitry 1010 to unlock the electronic lock 1009 to unlock the smart safe 100. The microcontroller 1030 may receive a status from the motor controller 1032 that the electronic lock 1009 is successfully unlocked and the microcontroller 1030 may control the user interface 800 to provide visual feedback (e.g., discontinue illuminating light 804, or flash the light 804 for a brief time) or audible feedback (e.g., another particular tone or sound produced by the sound generator 1034) to indicate that the smart locker 100 is unlocked.

The microcontroller may include of be connected to a memory. The memory may store control instructions, operational parameters for the control instructions, datasets, and other information. The control instructions may be executed by the microcontroller 1030 to implement any of the processing described herein.

In other embodiments, the smart locker 100 includes communication circuitry configured to connect with other devices within an office or home setting. For example, the communication circuitry may support wireless communication via antennas according to various wireless communication protocols, including Bluetooth, Wireless Fidelity (Wi-Fi), Wireless Local Area Network (WLAN), near field communication protocols, cellular protocols (2G, 3G, 4G, Long Term Evolution (LTE) Long Term Expansion Advanced (LTE-A)), or other wireless protocols. Also, the communication circuitry may support wired communication circuitry according to wired communication protocols such as Ethernet, Gigabit Ethernet, asynchronous transfer mode protocols, passive and synchronous optical networking protocols, Data Over Cable Service Interface Specification (DOCSIS) protocols, EPOC protocols, synchronous digital hierarchy (SDH) protocols, Multimedia over coax alliance (MoCA) protocols, digital subscriber line (DSL) protocols, cable communication protocols, or other networks and network protocols. The communication circuitry may be connected or configured to connect to networks, including the Internet or an intranet, to enable the smart locker 100 to communicate with other systems and devices.

For example, in one embodiments, the smart locker 100 also includes a proximity detector that can detect wireless tokens (e.g., RFID cards or bluetooth beacons) worn or carried by a user. The microcontroller 1030 may have stored therein one or more identifications corresponding to the wireless tokens of the various users. As a user with the wireless token moves away from the smart locker 100, the microcontroller 1030 may determine that the user is no longer present via the proximity detector, and may automatically lock the smart locker 100. Similarly, as the user returns, the microcontroller 1030 may detect the presence of the user via the proximity detector and may automatically unlock the smart locker 100.

The smart locker 100 may connect with central backend systems via the communication circuitry to enable remote control or central control of the smart locker 100. Additionally, the smart locker 100 can communicate status and usage data to the central backend systems, including a current operational status of the smart locker 100 (e.g., locked or unlocked, in need of repair, jammed, etc.) and identifications (if known) of users that have used the smart locker 100.

The electrical system 1000 may include one or all of the various circuit elements shown and discussed above such that the smart locker 100 may be modular to provide different functionality and features. For example, in one configuration, the smart locker 100 includes the charging board 1002 without the controller board 1004 so as to only provide charging capability (e.g., direct charging and/or wireless charging) without electronic locking capability. In other embodiments, both the charging board 1002 and the controller board 1004 are provided (to provide both direct charging and electronic locking capabilities), but the wireless charging circuitry 1012 is omitted (such that wireless charging capability is not provided). Further, due to the modularity, some or all of the modular components can be installed by a dealer or a user according to the particular needs of the particular application setting. Moreover, as the needs change over time, the smart locker 100 can be modified (e.g., upgraded) to include additional features not previously present (e.g., by adding the wireless charging device 600 at a later time).

FIG. 11 illustrates an electronics assembly 1100 in accordance with various embodiments. FIG. 11 provides a view of the electronics assembly 1100 from behind the front interface panel 125. In one embodiment, the electronics assembly 1100 is coupled to and supported by the front interface panel 125. The electronics assembly 1100 includes the charging board 1002, the controller board 1004, and the electronic lock 1009, including the electronic lock motor circuitry 1010 and the electronic motor 1011. The charging board 1002 and the controller board 1004 are interconnected by a cable assembly 1102. The charging board 1002 includes a primary input power input connector 1104, which connects to the primary power input cord 412. The charging board 1002 also includes the charting ports 150, which are accessible through the front interface panel 125.

The controller board 1004 includes the sound generator 1034 and a secondary input power connector 1106 that connects to the secondary power input cord 416 to receive secondary input power from a secondary power source 1026. The controller board 1004 also includes a wireless charging power output connector 1108 that connects to power cable 702 to provide power to the wireless charging device 600. The controller board 1004 also includes a wireless charging power output connector 1108 that connects to power cable 702 to provide power to the wireless charging device 600. The controller board 1004 also includes a keypad circuitry connector 1110 that connects to keypad circuitry 1008 in the form of the keypad circuit board 602 (see FIG. 6). The controller board 1004 also includes an electronic lock connector 1112 that connects to the electronic lock motor circuitry 1010.

The electronic lock 1009 includes the electronic lock motor circuitry 1010 and the electronic motor 1011. The electronic motor 1011 is connected to one end of a member 1114, which member 1114 is connected to a latch assembly 1116 at its other end. The electronic motor 1011 rotates in response to signals from the electronic lock motor circuitry 1010, which rotation causes a lateral displacement of the member 1114 that in turn rotates the latch assembly 1116 from an unlocked position to a locked position, or vice versa.

Figure 12:
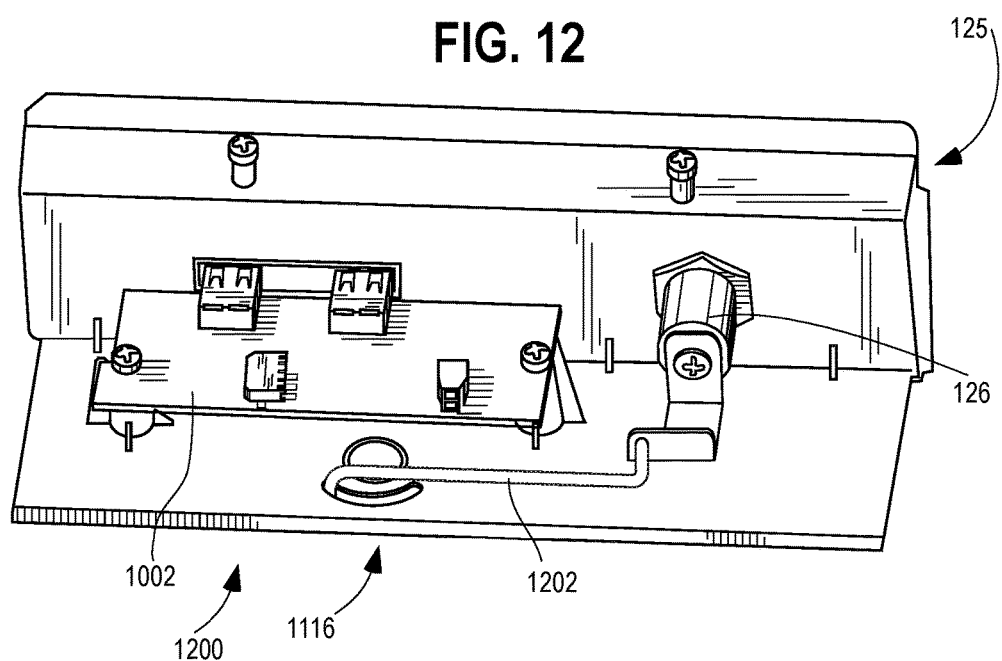
FIG. 12 shows another electronics assembly of the smart locker in accordance with various embodiments.

FIG. 12 shows a different electronics assembly 1200 in accordance with a different embodiment. In this embodiment, the smart locker 100 does not include an electronic lock 1009, and instead includes a manual lock 126. Rotation of the manual lock 126 (e.g., by insertion and rotation of a key 128) causes a member 1202 to move, which in turn rotates the latch assembly 1116 from an unlocked position to a locked position, or vice versa.

As is illustrated in FIGS. 11 and 12, the front interface panel 125 and the electronics assemblies 1100 and 1200 connected thereto may form modules that can be installed or swapped out by a manufacturer, installer, or a user to provide different levels of functionality.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The circuitry may store or access instructions for execution, or may implement its functionality in hardware alone. The instructions may be stored in one or more non-transitory computer-readable mediums that may include a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings. The computer-readable medium may include instructions that, when executed by circuitry elements, cause the circuitry elements to perform a method including one or more steps discussed in this disclosure.

Various implementations have been specifically described. However, many other implementations are also possible.

What is claimed is:

1. A storage locker comprising:
 a main body including a lockable storage compartment;
 a top platform coupled to the main body, the top platform comprising:
   a top surface for supporting a portable battery operated electronic device; and
   a wireless charging device configured to provide wireless charging power to the portable battery operated electronic device via a wireless charging receiving device of the portable battery operated electronic device when the portable battery operated electronic device is supported on the top surface; and
 an opening between the top platform and the main body configured to receive a portion of a work surface such that the main body is located substantially below the opening and the top platform is located substantially above the opening.

2. The storage locker of claim 1 further comprising a charging connector configured to electrically couple to another portable battery operated electronic device to provide direct charging power to the other portable battery operated electronic device.

3. The storage locker of claim 1 wherein the top platform is configured to sit on a top surface of a substantially horizontal work surface and support the storage locker, and wherein the storage compartment is supported by the work surface.

4. The storage locker of claim 1 further comprising:
 an electronic lock configured to lock a door of the lockable storage compartment in the closed position and to unlock the door;

electronic lock controlling circuitry configured to receive user commands and operate the electronic lock in accordance with the user commands; and a keypad coupled to the electronic lock controlling circuitry to receive the user commands and communicate the user commands to the electronic lock controlling circuitry, the keypad comprising a portion of the top surface.

5. The storage locker of claim 4 wherein the keypad further comprises at least one of a capacitive touch keypad or a capacitive signature sensing keypad.

6. The storage locker of claim 1 wherein the wireless charging device is below the top surface and covered by the top surface.

7. The storage locker of claim 1 wherein the wireless charging device comprises an inductive charging coil.

8. The storage locker of claim 1 wherein the wireless charging device comprises an inductive charging mat.

9. A storage cabinet comprising:
a main body including a storage compartment;
a top platform coupled to the main body, the top platform comprising a wireless charging device configured to provide wireless charging power to the portable electronic device when the portable electronic device is placed in close proximity to the wireless charging device; and
an opening between the top platform and the main body configured to receive a portion of a work surface such that the main body is located substantially below the opening and the top platform is located substantially above the opening.

10. The storage cabinet of claim 9 wherein the main body is configured to be suspended below the work surface.

11. The storage cabinet of claim 9 further comprising:
a charging connector configured to electrically couple to a second portable electronic device to provide direct charging power to the second portable electronic device.

12. The storage cabinet of claim 11 further comprising: charging circuitry configured to:
receive primary operating power; and
provide the direct charging power derived from the primary operating power.

13. The storage cabinet of claim 9 wherein the top platform further comprises a visual indicator to indicate the location where the portable electronic device is to be placed on the top platform in order to receive the wireless charging power.

14. The storage cabinet of claim 13 wherein the visual indicator further comprises at least one of a marking, a screen-printed image, a light, a texture, a raised molded pattern or image, a grooved molded pattern or image, a decal, a sticker, an indentation, a dip, or a hump in or on a top surface of the top platform.

15. The storage cabinet of claim 9 wherein the wireless charging device comprises an inductive charging coil.

16. The storage cabinet of claim 9 wherein the wireless charging device comprises an inductive charging mat.

17. The storage cabinet of claim 9 further comprising:
a lower tray coupled to an underside of the top platform, wherein the wireless charging device is mounted to the lower tray such that the wireless charging device is housed between the underside of the top platform and the lower tray.

18. The storage cabinet of claim 9 further comprising:
a door configured to allow and prevent access to the storage compartment when the door is in an open position and a closed position, respectively;
an electronic lock configured to lock the door in the closed position and to unlock the door; and
electronic lock controlling circuitry configured to receive user commands and operate the electronic lock in accordance with the user commands.

19. The storage cabinet of claim 18 further comprising:
a keypad coupled to the electronic lock controlling circuitry to receive the user commands and communicate the user commands to the electronic lock controlling circuitry, the keypad comprising a portion of the top surface.

20. The storage cabinet of claim 9 wherein the top platform further comprises a tray having a raised perimeter edge along at least a portion of the edge of the top platform.

* * * * *